United States Patent
Yeung et al.

(10) Patent No.: US 8,520,147 B1
(45) Date of Patent: Aug. 27, 2013

(54) SYSTEM FOR SEGMENTED VIDEO DATA PROCESSING

(75) Inventors: Lawrence S. Yeung, Fremont, CA (US); Remi C. Lenoir, Menlo Park, CA (US)

(73) Assignee: Marseille Networks, Inc., Santa Clara, CA (US)

( * ) Notice: Subject to any disclaimer, the term of this patent is extended or adjusted under 35 U.S.C. 154(b) by 0 days.

(21) Appl. No.: 13/134,814

(22) Filed: Jun. 16, 2011

(51) Int. Cl.
   *H04N 7/00* (2011.01)

(52) U.S. Cl.
   USPC .......................................................... 348/723

(58) Field of Classification Search
   USPC ................ 348/723, 725, 525, 552, 581, 564, 348/500, 441, 715–717, 515
   See application file for complete search history.

(56) References Cited

U.S. PATENT DOCUMENTS

| | | | | |
|---|---|---|---|---|
| 4,494,144 A * | 1/1985 | Brown | .................. | 348/420.1 |
| RE36,509 E * | 1/2000 | Shigihara | .................. | 348/564 |
| 6,388,711 B1 * | 5/2002 | Han et al. | .................. | 348/441 |
| 6,400,414 B1 * | 6/2002 | Tsukida | .................. | 348/581 |
| 6,567,985 B1 * | 5/2003 | Ishii | .................. | 725/115 |
| 8,284,307 B1 * | 10/2012 | Yeung | .................. | 348/441 |
| 2006/0023065 A1 * | 2/2006 | Alden | .................. | 348/51 |
| 2006/0025689 A1 * | 2/2006 | Chalana et al. | .................. | 600/456 |
| 2006/0158691 A1 * | 7/2006 | Kakutani | .................. | 358/3.01 |
| 2007/0058218 A1 * | 3/2007 | Kikuchi | .................. | 358/474 |
| 2008/0112480 A1 * | 5/2008 | Frommann | .................. | 375/240 |
| 2010/0003015 A1 * | 1/2010 | Rodriguez et al. | .................. | 386/113 |
| 2011/0032422 A1 * | 2/2011 | Yamamoto et al. | .................. | 348/500 |
| 2011/0285915 A1 * | 11/2011 | Fracchia | .................. | 348/723 |
| 2013/0004088 A1 * | 1/2013 | Yeung | .................. | 382/218 |

* cited by examiner

*Primary Examiner* — Paulos M Natnael

(57) ABSTRACT

A system comprising a single or multiple independent video sources, where each video source manages to transmit its video data information using a predefined video segment size. The system comprises a segmented video data processing unit that receives the transmitted video segments, groups and processes the received video segments in accordance with the corresponding video source, produce video data information from the received video segments, and stores in proper order the processed video data information from a single source into a single memory queue. An output display processing unit receives the video data information from at least one of the memory queues, and manages the processing and formatting of the received video data information in accordance with preselected preferences such as output image video format, resolution, and/or starting location of a first video pixel of the output image. The processed and formatted video data information is used to display the output image using a high resolution electronic display.

36 Claims, 4 Drawing Sheets

Processed Output Image 400

Row Number 420

| L00 | L01 | L02 | L03 | L04 | L05 | L06 | L07 | L08 | L09 | L10 | L11 | L12 | L13 |

Third Region 450

Second Region 440

First Region 430

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|
| 24 | 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 |
| 48 | 49 | 50 | 51 | 52 | 53 | 54 | 55 | 56 | 57 | 58 | 59 | 60 | 61 | 62 | 63 | 64 | 65 | 66 | 67 | 68 | 69 | 70 | 71 |
| 72 | 73 | 74 | 75 | 76 | 77 | 78 | 79 | 80 | 81 | 82 | 83 | 84 | 85 | 86 | 87 | 88 | 89 | 90 | 91 | 92 | 93 | 94 | 95 |
| 96 | 97 | 98 | 99 | 100 | 101 | 102 | 103 | 104 | 105 | 106 | 107 | 108 | 109 | 110 | 111 | 112 | 113 | 114 | 115 | 116 | 117 | 118 | 119 |
| 120 | 121 | 122 | 123 | 124 | 125 | 126 | 127 | 128 | 129 | 130 | 131 | 132 | 133 | 134 | 135 | 136 | 137 | 138 | 139 | 140 | 141 | 142 | 143 |
| 144 | 145 | 146 | 147 | 148 | 149 | 150 | 151 | 152 | 153 | 154 | 155 | 156 | 157 | 158 | 159 | 160 | 161 | 162 | 163 | 164 | 165 | 166 | 167 |
| 168 | 169 | 170 | 171 | 172 | 173 | 174 | 175 | 176 | 177 | 178 | 179 | 180 | 181 | 182 | 183 | 184 | 185 | 186 | 187 | 188 | 189 | 190 | 191 |
| 192 | 193 | 194 | 195 | 196 | 197 | 198 | 199 | 200 | 201 | 202 | 203 | 204 | 205 | 206 | 207 | 208 | 209 | 210 | 211 | 212 | 213 | 214 | 215 |
| 216 | 217 | 218 | 219 | 220 | 221 | 222 | 223 | 224 | 225 | 226 | 227 | 228 | 229 | 230 | 231 | 232 | 233 | 234 | 235 | 236 | 237 | 238 | 239 |
| 240 | 241 | 242 | 243 | 244 | 245 | 246 | 247 | 248 | 249 | 250 | 251 | 252 | 253 | 254 | 255 | 256 | 257 | 258 | 259 | 260 | 261 | 262 | 263 |
| 264 | 265 | 266 | 267 | 268 | 269 | 270 | 271 | 272 | 273 | 274 | 275 | 276 | 277 | 278 | 279 | 280 | 281 | 282 | 283 | 284 | 285 | 286 | 287 |
| 288 | 289 | 290 | 291 | 292 | 293 | 294 | 295 | 296 | 297 | 298 | 299 | 300 | 301 | 302 | 303 | 304 | 305 | 306 | 307 | 308 | 309 | 310 | 311 |
| 312 | 313 | 314 | 315 | 316 | 317 | 318 | 319 | 320 | 321 | 322 | 323 | 324 | 325 | 326 | 327 | 328 | 329 | 330 | 331 | 332 | 333 | 334 | 335 |

Fourth Region 460

Column Number 410

| P00 | P01 | P02 | P03 | P04 | P05 | P06 | P07 | P08 | P09 | P10 | P11 | P12 | P13 | P14 | P15 | P16 | P17 | P18 | P19 | P20 | P21 | P22 | P23 |

Fig. 4

SYSTEM FOR SEGMENTED VIDEO DATA PROCESSING

TECHNICAL FIELD

The subject of this application generally relates to the field of digital image processing and more particularly to the transmission and processing of segmented video data information.

BACKGROUND

Currently there exist various methods that may be used for transmitting video data information to an electronic display monitor using analog or digital format. The video data information correspond to an image or sequence of images from a video source. Regardless of the video data information transmission format, the transmission is subject to the bandwidth limitation of the transmission system being used. A video data information system transmission system comprises a transmitter, a transmission link, and a receiver. Usually the maximum data information transmission rate is limited to the maximum transmission rate of any one of the three components of the transmission system. In addition, various digital video standards have their own limitations in terms of maximum resolution of video data information that can be accommodated during transmission. For example, a transmission system used to transmit video data information using a video standard format with a maximum resolution of 1024×768 pixels may not be used to transmit high definition video data information of an image with a resolution of 1920×1080 pixels.

A video source that generates video data information for a high resolution image will not be able to transmit the full image's resolution using a transmission system having a maximum transmission rate that is not capable of handling the video data information of the high resolution image. Accordingly, the resolution (or size) of the image must be reduced to match the transmission system's maximum resolution so that the video data information can be properly transmitted. One possible solution may include cropping the image. However, this would lead to a loss of at least some portion of the image. Another possible solution is scaling down the image resolution to the desired transmission system resolution. This would also cause the loss of some of the image's details or quality.

Consequently, a challenge exists for the transmission of video data information of a high resolution image using a transmission system with a lower resolution as compared with the image's resolution. Similarly, various challenges exist when transmitting video data information for images from multiple video sources, where the total bandwidth required for transmitting the full images' exceeds the bandwidth of the transmission system. Therefore, there exists a need for a system capable of providing the means to efficiently and correctly transmit video data information of a high resolution image using a lower resolution video data information transmission system.

An exemplary image with a High-Definition television (HD TV) resolution comprises 1,920 pixels wide and 1,080 pixels high, as compared with a Standard-Definition television (SD TV) resolution that comprises 720 pixels wide and 480 pixels high. Another example of next generation digital TVs utilizing Quad-HD resolution that is able to display four times the high definition resolution of HD TV sets, i.e. Quad-HD monitor is capable of displaying 3,840 pixels wide and 2,160 pixels high. A challenge exists when a Quad-HD video source is to transmit its video data information using a transmission system that is only capable of transmitting of HD TV resolution or lower. Currently, the video data information of the Quad-HD video image must be resized or scaled down so that it can be transmitted using the HD TV transmission system. Similarly, the video data information of an HD TV image would not be able to be transmitted directly using its full resolution of 1,920 pixels wide and 1,080 pixels high using a transmission system capable of handling only a maximum resolution of 1,024 pixels wide and 768 pixels high. Thus, cropping or other methods of scaling down the resolution of the image is necessary so that the resultant video data information can be transmitted using the lower resolution transmission system.

In view of the above presented challenges, higher resolution video transmission systems are constantly being designed and implemented to be able to handle video data information for images with an ever higher resolution. However, the present description can provide a quick and lower cost solution to transmit video data information for a high resolution image using an already available lower resolution transmission system. A detailed description of various methods and apparatus is presented in the following paragraphs.

In accordance with one embodiment, a high resolution image is partitioned into multiple parts, each of which has a resolution that is at or less than the maximum resolution requirement of the intended transmission system to be used. The video data information of one part of the high resolution image is transmitted as one video data information segment using the transmission system. The video data information segments corresponding to the remaining parts of the image are transmitted until all of the video data information of the high resolution image has been transmitted. The receiver receives the video data information segments which are then temporarily stored in queue buffers and appropriately processed and recombined to reproduce the original high resolution image. The resultant video data information is moved to another storage location where further processing may be applied before outputting the video data information of the high resolution image to be displayed using an electronic display or a high resolution monitor.

Marseille Networks' 4xHD™ video technology delivers the ability to process digital images to be displayed in 3840× 2160 resolution, while selectively removing artifacts and preserving stunning image details. Furthermore, Marseille Networks is the first to introduce Quad-HD solution to home theater systems. Marseille Networks' 4xHD™ video technology provide an efficient system with ample flexibility and processing power for blending, scaling and displaying video data information using various format and/or standards.

BRIEF DESCRIPTION OF THE DRAWINGS

FIG. 4 shows an exemplary processed output image to be displayed, in accordance with one embodiment.

DETAILED DESCRIPTION

Figure 1:
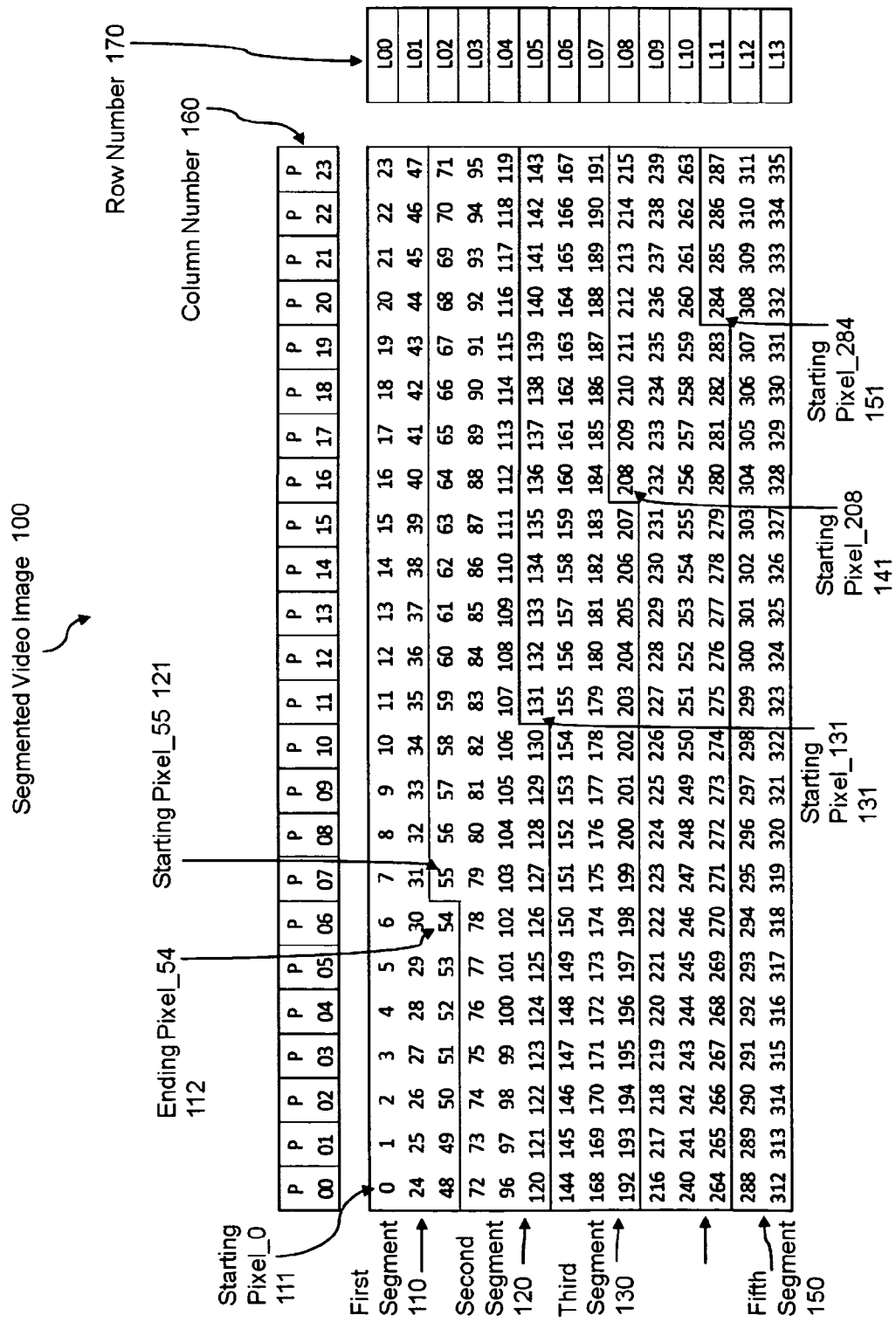
FIG. 1 shows an exemplary segmented image with a resolution of 24 pixels wide and 14 pixels high, in accordance with one embodiment.

The present description makes available in the following paragraphs a method and an apparatus to transmit video data information for a high resolution image using an already available lower resolution transmission system. The present disclosure and the various features and advantageous details are explained more fully with reference to the nonlimiting embodiments that are illustrated in the accompanying drawings and detailed in the following description. Descriptions of well-known processing techniques, components, and equipment are omitted so as not to unnecessarily obscure the invention in detail. It should be understood, however, that the detailed description and the specific examples, while indicating embodiments of the invention, are given by way of illustration only and not by way of limitation. Various substitutions, modifications, additions, and/or rearrangements within the spirit and/or scope of the underlying inventive concepts will become apparent to those of ordinary skill in the art from this disclosure. Other features and associated advantages will become apparent with reference to the following detailed description of specific embodiments in connection with the accompanying drawings.

The term "coupled" is defined as connected, although not necessarily directly, and not necessarily mechanically. The terms "a" and "an" are defined as one or more unless this disclosure explicitly requires otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements possesses those one or more steps or elements, but is not limited to possessing only those one or more elements. Likewise, a step of a method or an element of a device that "comprises," "has," "includes" or "contains" one or more features possesses those one or more features, but is not limited to possessing only those one or more features.

Furthermore, a device or structure that is configured in a certain way is configured in at least that way, but may also be configured in ways that are not listed. In particular, "video" (and any form of associated words with video, such as "digital video", "video field", "video frame", "digital video field", "digital video frame", "analog video", "image", "video image", "frame", "video frame", "digital frame") may take on various resolution and format of different video standard and may take the form of electrical, magnetic, electromagnetic, or optical signals capable of being stored transmitted, transferred, combined and otherwise manipulated through software, hardware, firmware or any combination thereof. Furthermore, the word "image" may be used interchangeably to mean "a complete image", "a complete set of video data information that correspond to an image", "a complete set of video data information that correspond to a portion of an image", "a portion of an image", "a specific region of an image", "one or multiple video data information segments that correspond to an image", "one or multiple video data information segments that correspond to a portion of an image", or "a video image". Various operations may be described as a series of multiple steps so that it may be helpful to understand the present invention. However, it should not be concluded that these operations are necessarily processed in the order described. In fact, various operations may be performed or executed concurrently while achieving the same outcome. Thus, it should not be construed or implied that various operations are order dependent unless specifically stated otherwise.

An exemplary Segmented Video Image 100, as shown in FIG. 1, comprising three hundred thirty six pixels that are arranged in twenty four pixels wide and fourteen pixels high matrix. In accordance with one embodiment, the Segmented Video Image 100 is partitioned into variable size parts, and each part comprising a predefined number of pixels. Each part is determined by a starting pixel and a specific total number of pixels. For example, the video data information of the first part is graphically shown in FIG. 1 as First Segment 110 having a total number of pixels that is fifty five and a Starting Pixel_0 111. Similarly the video data information of the second part is graphically shown as Second Segment 120 having a total number of pixels that is seventy six and a Starting Pixel_55 121. The video data information of the other parts are identified in FIG. 1 as Third Segment 130 having a total number of pixels that is seventy seven and a Starting Pixel_131 131, Fourth Segment 140 having a total number of pixels that is seventy six and a Starting Pixel_208 141, and Fifth Segment 150 having a total number of pixels that is fifty two and a Starting Pixel_284 151. Another way to determine each part of the Segmented Video Image 100 is to specify a starting pixel and ending pixel. For example, the First Segment 110 is specified using the Starting Pixel_0 111 and an Ending Pixel_54 112. Furthermore, the Column Number 160 and Row Number 170 may be used to determine the location of every pixel within the Segmented Video Image 100. For example, the Starting Pixel_0 111 may also be determined using column and row numbers P00xL00, and the Ending Pixel_54 112 may be specified using column and row numbers P06xL02.

A video data information segment is generated for each part of the Segmented Video Image 100, as shown in FIG. 1, wherein the video data information segment size corresponds to the resolution of each part. In accordance with one embodiment, the Segmented Video Image 100 is partitioned into multiple parts, each of which comprises a predefined number of pixels. It may be necessary for a given video data information transmission system to have all data information segments, which are to be transmitted, to meet a certain size minimum and maximum size requirement before they are ready for transmission. If a part of the video image does not meet the minimum number of pixels requirement, then one possible solution is to generate additional pixels that are used to pad the video data information segment to the desired minimum size before being transmitted. These additional pixels are then removed when the video data information segment is received and processed. It is important that the total number of pixels (or the resolution) of each part of the Segmented Video Image 100 is less than or equal to the maximum resolution that the intended transmission system is capable of handling. If a part of the video image does not meet the maximum number of pixels requirement, then one possible solution, in accordance with one embodiment, is to generate multiple video data information segments for each part of the Segmented Video Image 100.

A practical example of transmitting a Quad-HD resolution (3840×2160) image using a video transmission system capable of transmitting images having a maximum resolution of 1024×768 would require the full Quad-HD resolution image to be partitioned into at least eleven parts. Each of the first ten parts comprises 786,432 pixels and the eleventh part comprises 430,080 pixels. The video data information segment size would depend on the number of bits used to represent each pixel. Taking 8-bit RGB format means that a three Bytes of data is used to represent each pixel. Hence, the size of each of the first ten video data information segments comprises 2,359,296 Bytes, while the size of the eleventh video data information segment comprises 1,290,240 Bytes.

In accordance with one embodiment, a first sync data information segment is generated and transmitted immediately prior to at least one of the video data information segments. The sync data information segment comprises data information that corresponds to at least one of a data pattern, a starting pixel number, total number of pixels, starting pixel location, ending pixel location, image or frame identification number, segment identification number, and the number of video data information segments that will be transmitted immediately after the sync data information segment is transmitted. Once, the transmission system transmits the first sync data information segment followed by one or group of video data information segments, as specified by the first sync data information segment, a second sync data information segment is generated and transmitted followed by the appropriate number of video data information segment. The process continues until all of the video data information segments of the Segmented Video Image 100 have been transmitted. The process will repeat for the next image.

An exemplary single sync data information segment is generated comprising data information that corresponds to the total number of video data information segments to be transmitted for the Segmented Video Image 100, as shown in FIG. 1. In this example, five video data information segments are to be transmitted consecutively right after transmitting the sync data information segment. In addition, the sync data information segments comprises data information that corresponds to the total number of pixels and a starting pixel location for each of the video data information segments, as described in paragraph [0016]. The sync data information segment is transmitted first followed by the five video data information segments.

Various types of transmission medium may be used to link the receiver to the transmitter, e.g. wireless, or wired. Various well known techniques for data transmission and error recovery may be used based on the types of transmission link being used and the overall system requirement. A fully operational transmission system would operate properly when one skilled in the art implements basic well known techniques for a transmission system and thus will not be further discussed here. The transmission system's receiver receives the data information segments, normally, in the same sequential order as the transmitted data information segments.

A sync detection procedure looks for a first sync data information segment, within the sequence of data information segments received, in order to obtain the necessary data information, e.g. number and size of data information segments, to be used for receiving and processing the video data information segments that are to be received immediately following the sync data information segment, as described above. If the first received data information segment is not determined to be a sync data information segment, then it is discarded and the second received data information segment is checked, and so on until the first sync data information segment is determined and accordingly processed. The data information obtained from the sync data information segment is used to program the appropriate functions of the receiver system in order to correctly receive and process the appropriate number of video data information segments.

Figure 2:
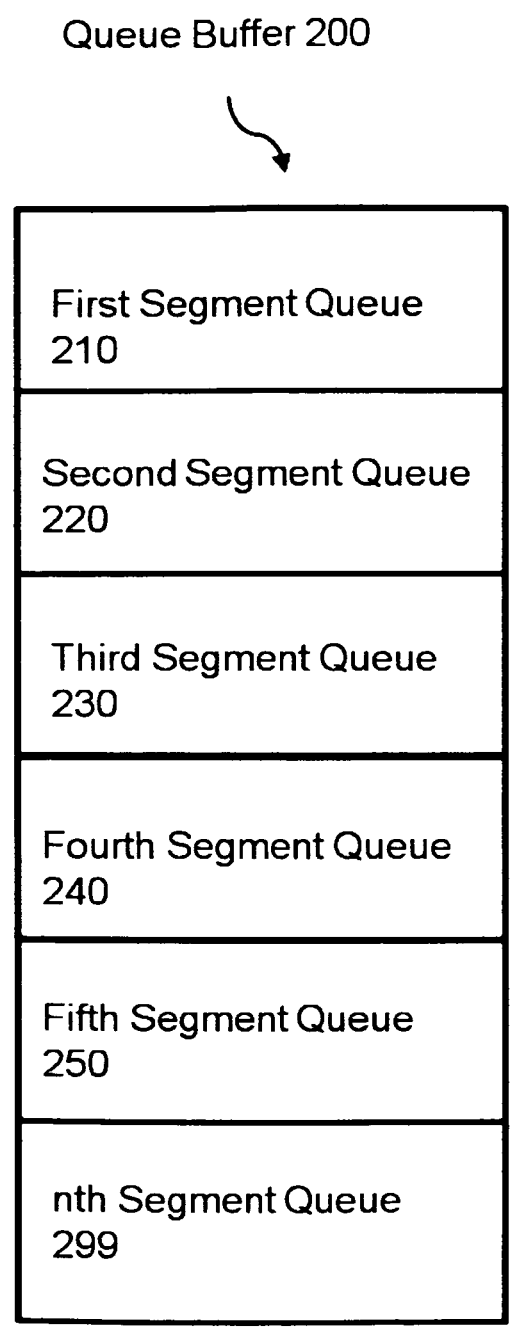
FIG. 2 shows an exemplary queue buffer partitioning to store the received segmented video data information, in accordance with one embodiment.

The Queue Buffer 200, as shown in FIG. 2, is usually part of a memory subsystem that can be partitioned to a certain number of queues, wherein each of the queues can have a programmable size to store the designated processed video data information of the corresponding one or multiple video data information segments that are to be received. In this example and based on the data information obtained from the first sync data information segment, five queues are allocated, one for each of the five segments of Segmented Video Image 100. Subsequent to the first sync data information segment, each video data information segment received is processed and its video data information content is prepared to be transferred to the corresponding part of Queue Buffer 200 that is allocated for the corresponding video data information segment. Each allocated portion of Queue Buffer 200 e.g. First Segment Queue 210, as shown in FIG. 2, is activated when the video data information content is ready to transferred and stored. Upon completing the transfer and storage of the processed video data information the queue buffer is deactivated.

In this example, the First Segment Queue 210, as shown in FIG. 2, is activated and enabled to receive and store the video data information of the first fifty five pixels (established by the First Segment 110) when the first video data information segment is correctly received, processed and determined to comprise the video data information of the First Segment 110. Upon storing the processed video data information of the First Segment 110, the First Segment Queue 210 is activated and is disabled from any further write operation. Similarly, the following four data information segments are sequentially received and processed to produce the corresponding video data information of the Second Segment 120, Third Segment 130, Fourth Segment 140, and Fifth Segment 150, shown in FIG. 1. When the video data information content is ready to be transferred and stored, one of the corresponding Second Segment Queue 220, Third Segment Queue 230, Fourth Segment Queue 240, and Fifth Segment Queue 250 is activated and enabled accordingly. Consequently, only one of the queue buffers is active at a time while all others are disabled. The Nth Segment Queue 299 represents the available memory capacity of the Queue Buffer 200 system.

In accordance with one embodiment, one queue buffer is activated to store the video data information content of all of the video data information segments to be received after the first detected sync data information segment and prior to the subsequently received sync data information segment. Hence, The First Segment Queue 210 is sized accordingly to receive and store the video data information for all five parts for the exemplary Segmented Video Image 100, and is activated for the duration necessary to receive, process, transfer and store the video data information. Once this process is completed, the First Segment Queue 210 is deactivated and disabled to prevent any additional write operation. Once the second sync data information segment is detected, received and processed, the Second Segment Queue 220 would then be sized in accordance with the data information obtained from the second sync data information segment, and so on. The processed video data information is stored sequentially in an identical order as the received video data information segments order, which is normally the same as the partitioning and transmission order. Under certain conditions, e.g. error recovery procedure wherein a retransmission of a certain segment or multiple segment are to be retransmitted, then certain number of video data information segments may be received out of sequential order of the original partitioning of the image. In accordance with one embodiment, the processed video data information of each video data information segment is appropriately identified with the corresponding segment identification number that is assigned to the video data information segment at the time the video data information segment was generated. Thus, the corresponding queue buffer is correctly activated to receive and store the processed video data information.

Figure 3:
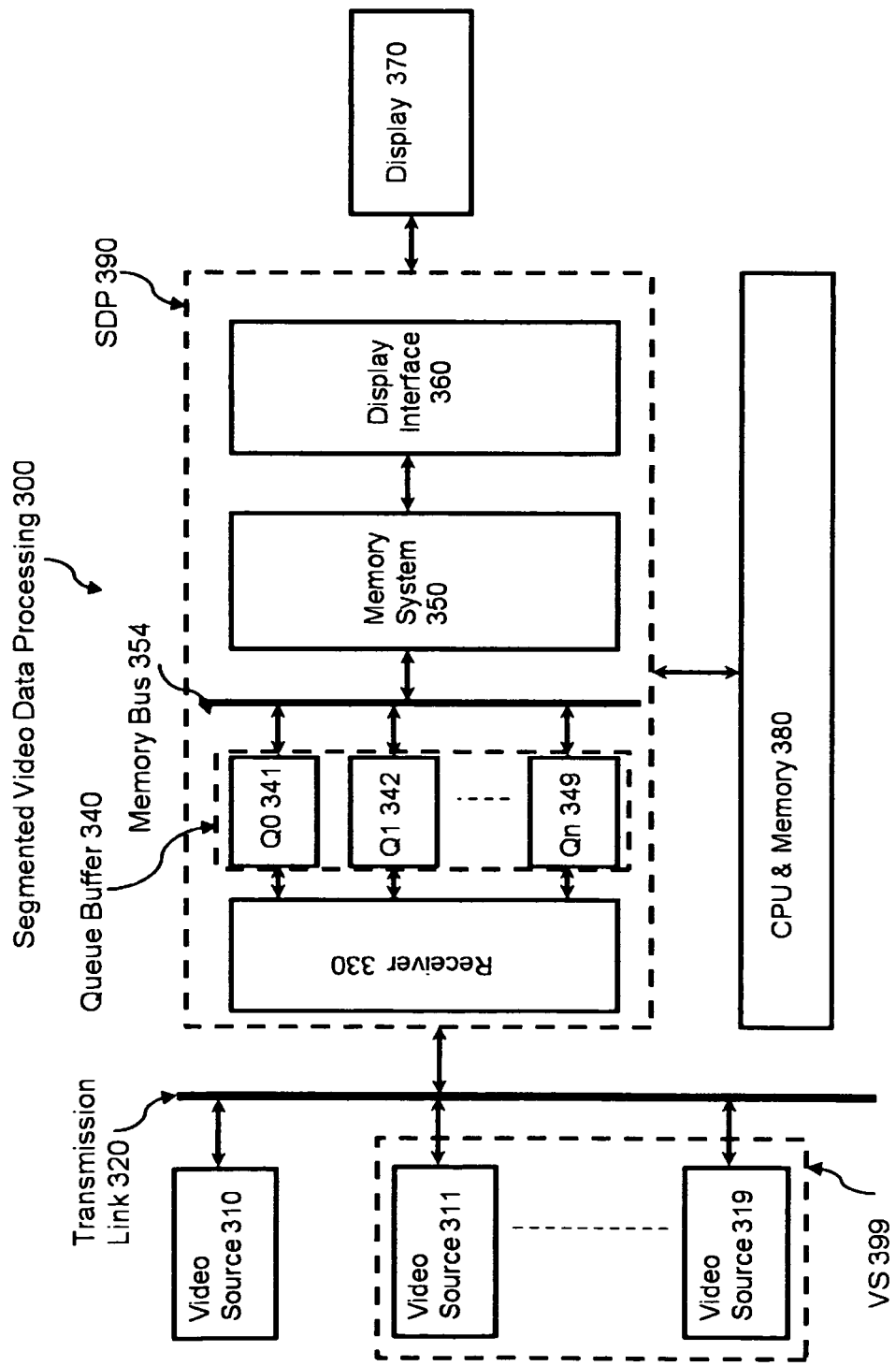
FIG. 3 shows an exemplary transmission system using single or multiple video sources, in accordance with one embodiment.

An exemplary system for Segmented Video Data Processing 300 is shown in FIG. 3. In accordance with one embodiment, the system comprises a Video Source 310, a bandwidth limited Transmission Link 320, a segmented data processing module SDP 390, a host processing system CPU & Memory 380, and an electronic display system Display 370. The Video Source 310 comprises a transmitter system that is coupled to the bandwidth limited Transmission Link 320, wherein the transmitter system performs all the necessary operations required to transmit multiple video images using the Transmission Link 320. The transmitting operations comprise the following steps (i) partitioning a current image into a first number of parts based at least in part on one of a first resolution value of the current image and a first bandwidth value of the bandwidth limited Transmission Link 320, (ii) generating a video data information segment for each one of the first number of parts of the current image, (iii) generating a current sync data information segment comprising an identification value that identifies the current image, a first value that corresponds to the first number of parts of the current image, and a second value that corresponds to a second number of video data information segments to be transmitted immediately after the current sync data information segment, (iv) sequentially transmitting the current sync data information segment followed by at least one of the video data information segments, in accordance with the second value, using the bandwidth limited transmission link, and (v) repeating step (iv) until each one of the video data information segments of the current image is transmitted.

In accordance with one embodiment, the segmented data processing module SDP 390 comprises a receiver system Receiver 330 that is coupled to a programmable Queue Buffer 340, which comprises a programmable number of queue buffers Q0 341, Q1 342, and Qn 349. The Queue Buffer 340 is designed to allocate a programmable buffer size capacity to each of the queue buffers Q0 341, and Q1 342. Additional number of queue buffers can also be created via a programmable command so that the Queue Buffer 340 is flexible to generate any number of queue buffers needed with a programmable buffer size for each queue buffer to accommodate the video data information to be store therein. The Queue Buffer 340 is coupled to Memory Bus 354, which in turn is coupled to Memory System 350. A Display Interface 360 is coupled to the Memory Bus 354 and to an electronic display system Display 370. The Memory System 350 provides a temporary memory space to transfer video data information for a complete image, or a frame, from the corresponding dedicated queue buffer within the Queue Buffer 340, in accordance with commands from the Display Interface 360. The Memory System 350 is capable of storing video data information for multiple images based on the Display Interface 360 needs to process, blend or aggregate multiple images that were already received and stored in the Queue Buffer 340. The Display Interface 360 drives the Display 370 in accordance with a predefined resolution and location for the received video data information of the received images. The host system CPU & Memory 380 provides an additional computing and storage memory for user defined processing, editing, special effect and aggregation of one or multiple received images. The following paragraphs describe the steps necessary to receive the transmitted data information segments.

The receiver system Receiver 330 is coupled to the bandwidth limited Transmission Link 320. In accordance with one embodiment, the Receiver 330 performs all the necessary operations required to receive multiple video images that were transmitted using the Transmission Link 320, wherein all video data information segments that are received between two sync data information segments are processed to produce video data information that is stored in one queue buffer. The receiving operations comprise the following steps (i) sequentially receiving data information segments using the bandwidth limited Transmission Link 320, (ii) determining a first sync data information segment, within the sequentially received data information segments, and processing the first sync data information segment to extract a current identification value, a current first value, and a current second value, (iii) assigning a first queue buffer Q0 341 using the extracted current identification value, and activating the first queue buffer Q0 341 based on the extracted current first value, (iv) extracting video data information using a first data information segment received following the first sync data information segment, (v) storing the extracted video data information using the activated first queue buffer Q0 341, and (vi) repeating the steps of (iv) and (v) based on the extracted current second value, or until the next sync data information segment is received and determined to be a valid data information segment. Furthermore, a video data information transfer request is generated whenever step (vi) completes successfully, otherwise an error flag is generated that initiates an error data information segment to be generated and transmitted to the Video Source 310 using the Transmission Link 320 or using a side channel, so that a retransmission operation is initiated for the erroneously received video data information segment. Next paragraph will describe the processing of the next sync data information segment and the sequentially received video data information segments. If the next sets of video data information segments are a continuation of the current image then the same queue buffer Q0 341 is used to store the extracted video data information, otherwise a new queue buffer is assigned.

In accordance with one embodiment, the receiver system Receiver 330 is capable of receiving data information segments continuously, and the receiving operations further comprise the following steps (1) monitoring the sequentially received data information segments, (2) determining a second sync data information segment, within the sequentially received data information segments, and processing the second sync data information segment to extract a next identification value, a next first value, and a next second value, (3) comparing the next identification value with the current identification value (see paragraph [0027]), if the comparison indicates the next identification value is identical to the current identification value, assigning the first queue buffer Q0 341 using the current identification value, and activating the first queue buffer based on the extracted current first value, and if the comparison indicates the next identification value is different than the current identification value, assigning a second queue buffer Q1 342 using the next identification value, and activating the second queue buffer based on the extracted next first value, (4) extracting video data information using a first data information segment received following the second sync data information segment, (5) storing the extracted video data information, in accordance with the comparison result of step (3), using either one of the first and second queue buffers, Q0 341 and Q1 342, and (6) repeating the steps of (4) and (5) based on the extracted next second value. Furthermore, a video data information transfer request is generated whenever step (6) completes successfully, otherwise an error flag is generated that initiates an error data information segment to be generated and transmitted to the Video Source 310 using the Transmission Link 320 or using a side channel, so that a retransmission operation is initiated for the erroneously received video data information segment.

The segmented data processing SDP 390 comprises control logic and other modules to provide for power and performance management, these modules are not shown in FIG. 3 for clarity of the drawing. For example, controlling or responding to a video transfer request or an error flag require SDP 390 to comprise such logic function. Other type of control logic functions provide for having only one queue buffer that is active at a time to receive and store video data information from Receiver 330. Additionally, the appropriate read access of the Queue Buffer 340 by Memory System 350 through the Memory Bus 354 is maintained independently from the activation or deactivation of the Queue Buffer 340 by Receiver 330, while insuring that only valid video data information is read by Memory System 350, in response to the video data information transfer request. Other control logic functionality provides Queue Buffer 340 the ability to be programmed to create queue buffers partitions that are allocated in accordance with the content of the received sync data information segments. These types of control logic functions can be implemented by one skilled in the art using many various implementations. Hence, their implementations will not be further discussed here.

In accordance with one embodiment, the exemplary system for Segmented Video Data Processing 300 system previously described in paragraph [0025] and shown in FIG. 3 further comprises additional video source module VS 399 that is coupled to the bandwidth limited Transmission Link 320. The video source module VS 399 comprises Video Source 311 and Video Source 319 sub-systems that are similar to Video Source 310 described above, and each comprise its own transmitter system to transmit via the Transmission Link 320 its own video images. For example, Video Source 310 may be used for a live video feed, Video Source 311 may be used for relevant text and data information, and Video Source 319 may be used for background, graphics or static images. The number of additional video source modules is user defined and based on the desired performance for the Segmented Video Data Processing 300 system, and the output resolution capability of the electronic display system Display 370.

In accordance with one embodiment, the stored video data information in the first and second queue buffers Q0 341 and Q1 342 is transferred out of either one of the first and second queue buffer in response to the generated video data information transfer request due to a memory system request, or upon successful completion of storing a complete image or frame in either queue buffers Q0 341 and Q1 342. In accordance with one embodiment, one of the first and second queue buffers Q0 341 and Q1 342 is used to store video data information corresponding to and transmitted by a live video source, e.g. Video Source 310, while the other queue buffer is used to store video data information from at least one of graphics, text, and static video images corresponding to and transmitted by a second video source, e.g. Video Source 311. In accordance with one embodiment, one of the first and second queue buffers Q0 341 and Q1 342 is used to store video data information corresponding to a right channel video source of a 3D image, and the other queue buffer is used to store video data information corresponding to a left channel video source of the 3D image. The transferred video data information out of either or both of queue buffers Q0 341 and Q1 342 is then stored using Memory System 350 or the host processing system CPU & Memory 380 for further processing, editing, or manipulation. Once, the video data information of at least one complete image is stored in Memory System 350, then Display Interface 360 perform user or system defined processing of the video data information stored in the Memory System 350 to produce at least one output image in accordance with a predefined resolution and format. The Display Interface 360 then streams the processed video data information to be displayed using an electronic display system Display 370.

Furthermore, in accordance with one embodiment, multiple or a series of images may be stored in Memory System 350 such that Display Interface 360 perform user or system defined processing of the video data information of at least two images, stored in the Memory System 350, to produce at least one output image in accordance with a predefined resolution and format. Both of the stored images may be processed and combined to be displayed using a specific location for each within the output image. In accordance with one embodiment, the video data information of the stored images are aggregated to produce an output image with a resolution that is the sum of the resolution of both stored images. The Display Interface 360 then streams the processed video data information of the output image to be displayed using an electronic display system Display 370. In accordance with one embodiment, processing the video data information stored in the Memory System 350 comprises the processing of video data information of multiple images to produce video data information for a single output image using a predefined region, within the single output image, for each one of the multiple images. One skilled in the art would appreciate the many different possibilities to combine, blend, aggregate, and process two or more images as per Segmented Video Data Processing 300 specification, predefined, programmable, or user defined preferences.

In accordance with one embodiment, the receiver system Receiver 330 is capable of receiving data information segments continuously, and the receiving operations comprise the following steps (a) sequentially receiving data information segments using the bandwidth limited Transmission Link 320, (b) determining a current sync data information segment, within the sequentially received data information segments, and processing the current sync data information segment to extract a current identification value, a current first value, and a current second value, wherein (1) the current second value corresponds to a number of video data information segments to be transmitted immediately after the current sync data information segment, (2) the current first value corresponds to total number of parts that a current image is partitioned into, and (3) the current identification value associates the video data information segments with the current image being received, (c) comparing the current identification value with a previous identification value extracted from preceding sync data information segment, if the comparison indicates the current identification value is identical to the previous identification value, assigning a first queue buffer Q0 341 using the previous identification value, and activating the first queue buffer Q0 341 based on the previous first value, and if the comparison indicates the current identification value is different than the previous identification value, assigning a second queue buffer Q1 342 using the current identification value, and activating the second queue buffer Q1 342 based on the current first value, (d) extracting video data information using a data information segment received following the current sync data information segment, (e) storing the extracted video data information using one of the first and second queue buffer Q0 341 and Q1 342 that is activated in accordance with the comparison result of step (c), (f) repeating the steps of (d) through (e) based on at least one of the current second value and receiving a next sync data information segment, wherein (1) an error flag is asserted if a total number of data information segments, received between the current sync data information segment and the next sync data information segment, is different than the current second value, and (2) a frame flag is asserted upon storing entire video data information of the current image, (g) generating a first error data information segment based on the asserted error flag, (h) transmitting the first error data information segment using the bandwidth limited Transmission Link 320, (i) generating a current image video data information transfer request based on the asserted frame flag, (j) transferring and storing the video data information of the current image to a Memory System 350, wherein the Memory System 350 has a storage capacity that is at least four times the capacity needed to store the video data information of the current image, (k) processing the current image video data information, stored in the Memory System 350, to produce video data information of a first output image, and (l) streaming the processed video data information, of the first output image, to be displayed using an electronic display system Display 370, wherein processing the current image video data information stored in the Memory System 350 comprises the processing of video data information of the current image and the video data information of at least one additional image, to produce video data information for a second output image.

An exemplary Processed Output Image 400 having a resolution of three hundred thirty six pixels arranged in a twenty four pixel wide by fourteen pixels high (24×14) matrix is shown in FIG. 4. In accordance with one embodiment, the Processed Output Image 400 comprises four regions each having a predefined location and resolution within the Processed Output Image 400. These four regions are specified as First Region 430, Second Region 440, Third Region 450, and Fourth Region 460. The first region First Region 430 is defined within a quadrangle image having a resolution of ten pixels wide and ten pixels high (10×10), and having its four corner pixels located using Column Number 410 and Row Number 420 as P00xL00, P09xL00, P00xL09, and P09xL09. The Second Region 440 is defined within a quadrangle image having a resolution of ten pixels wide and ten pixels high (10×10), and having its four corner pixels located at P10xL00, P19xL00, P10xL09, and P19xL09. The Third Region 450 is defined within a quadrangle image having a resolution of four pixels wide and ten pixels high (4×10), and having its four corner pixels located at P20xL00, P23xL00, P20xL09, and P23xL09. Similarly, the Fourth Region 460 is defined within a quadrangle image having a resolution of twenty four pixels wide and four pixels high (24×4), and having its four corner pixels located at P00xL00, P23xL00, P00xL13, and P23xL13. The Display Interface 360 processes the video data information stored in the Memory System 350 corresponding to four images to produce video data information for a single output image Processed Output Image 400 to be displayed by Display 470. Each of the four images is processed and its video data information is used for one of the four regions First Region 430, Second Region 440, Third Region 450, and Fourth Region 460 within the Processed Output Image 400.

In accordance with one embodiment, all four images are aggregated together to produce the Processed Output Image 400. In this example, each of the four images corresponds to a portion or a segment of an original image having a resolution that matches the Processed Output Image 400 resolution. Each of the four images have been transmitted using either a single video data information segment, or multiple video data information segments. One skilled in the art would appreciate the many different possibilities to combine, blend, aggregate, and process the received images as per Segmented Video Data Processing 300 specification, predefined, programmable, or user defined preferences.

The exemplary embodiments as described in this disclosure are used to develop an efficient and cost effective method to process video fields and produce video frames that meet various specifications. The exemplary embodiments can also be practiced with certain modifications and alterations that those skilled in the art will recognize.

We claim:

1. A method for segmented video data information processing, the method comprising:
partitioning a first image having a first resolution value into a first number of parts based at least in part on one of the first resolution value and a first bandwidth value of a transmission link;
generating a first number of video data information segments, wherein each video data information segment of the first number of video data information segments has a second resolution value and comprises video data information that correspond to one of the first number of parts of the first image;
generating a first value that corresponds to the first number of video data information segments;
transmitting, in accordance with the first bandwidth value, the first value and at least one of the first number of video data information segments using the transmission link;
receiving a first sequence of data information segments using the transmission link, wherein the first sequence of data information segments comprises the first value followed by at least one of the first number of video data information segments;
determining the first value within the first sequence of data information segments;
processing video data information extracted from the first sequence of data information segments;
activating a first queue buffer to enable at least one write operation to the first queue buffer; and
storing the processed video data information using the first queue buffer, wherein the first queue buffer comprises processed video data information that correspond to the first image.

2. The method of claim 1, wherein the storing of the processed video data information using the first queue buffer follows sequentially in identical order as the received data information segments order within the first sequence of data information segments.

3. The method of claim 1, wherein the storing of the processed video data information using the first queue buffer follows sequentially and in identical order of the generated first number of video data information segments.

4. The method of claim 1, further comprising:
deactivating the first queue buffer, upon storing the processed video data information of a data information segment that correspond to the last part of the first image to be transmitted using the transmission link, to prevent any further write operation to the first queue buffer.

5. The method of claim 4, further comprising:
receiving from the first queue buffer the video data information that correspond to the first image; and
processing and formatting the received video data information of the first image to produce a first output image in accordance with at least one of a first video format, a first output image resolution, a first location of a first video pixel of the first image, and a second location of a first video pixel of the first output image.

6. The method of claim 4, further comprising:
partitioning a second image having a third resolution value into a second number of parts based at least in part on one of the third resolution value and a second bandwidth value of the transmission link;

generating a second number of video data information segments, wherein each video data information segment of the second number of video data information segments having a fourth resolution value and comprises video data information that correspond to one of the second number of parts of the second image, wherein a sum of each of the fourth resolution values equals the third resolution value;

generating a second value that corresponds to the second number of video data information segments; and transmitting the second value and at least one of the second number of video data information segments using the transmission link.

7. The method of claim 6, further comprising:

receiving a second sequence of data information segments using the transmission link, wherein the second sequence of data information segments comprises the second value followed by at least one of the second number of video data information segments;

determining the second value within the second sequence of data information segments;

processing video data information extracted from the second sequence of data information segments;

activating a second queue buffer to enable at least one write operation to the second queue buffer; and storing the processed video data information using the second queue buffer, wherein the second queue buffer comprises processed video data information that correspond to the second image.

8. The method of claim 7, wherein the storing of the processed video data information using the second queue buffer follows sequentially in identical order as the received data information segments order within the second sequence of data information segments.

9. The method of claim 7, wherein the storing of the processed video data information using the second queue buffer follows in identical order of the generated second number of video data information segments.

10. The method of claim 7, further comprising:

deactivating the second queue buffer, upon storing the processed video data information of a data information segment that correspond to the last part of the second image to be transmitted using the transmission link, to prevent any further write operation to the second queue buffer.

11. The method of claim 10, further comprising:

receiving from the second queue buffer the video data information that correspond to the second image; and processing and formatting the received video data information of the second image to produce a second output image in accordance with at least one of a second video format, a second output image resolution, a third location of a first video pixel of the second image, and a fourth location of a first video pixel of the second output image.

12. The method of claim 10, further comprising:

receiving from the first queue buffer the stored video data information that correspond to the first image;

receiving from the second queue buffer the stored video data information that correspond to the second image; and processing and formatting the received video data information of the first and second images to produce a third output image in accordance with at least one of a third video format, a third output image resolution, a fifth location of a first video pixel of the third output image.

13. The method of claim 12, wherein at least one pixel of the third output image is produced by blending the video data information of at least one pixel from each of the first and second images.

14. The method of claim 11, further comprising:

displaying the processed and formatted video data information of the second output image using an electronic display.

15. The method of claim 6, wherein the second number of video data information segments is at least equal to the second number of parts.

16. The method of claim 1, wherein the first number of video data information segments is at least equal to the first number of parts.

17. A method of transmitting multiple video images over a bandwidth limited transmission link, the method comprising the steps of:

(a) partitioning a current image into a first number of parts based at least in part on one of a first resolution value of the current image and a first bandwidth value of the bandwidth limited transmission link;

(b) generating a video data information segment for each one of the first number of parts of the current image;

(c) generating a current data information segment comprising (i) an identification value that identifies the current image, (ii) a first value that corresponds to the first number of parts of the current image, and (iii) a second value that corresponds to a first number of video data information segments to be transmitted immediately after the current data information segment;

(d) sequentially transmitting the current data information segment followed by at least one of the video data information segments, in accordance with the first bandwidth value, using the bandwidth limited transmission link; and repeating one or more of steps (c) and (d) until each one of the video data information segments of the current image is transmitted.

18. The method of claim 17, further comprising:

(e) sequentially receiving data information segments using the bandwidth limited transmission link;

(f) determining a first current data information segment, within the sequentially received data information segments, and processing the first current data information segment to extract a current identification value, a current first value, and a current second value;

(g) activating a first queue buffer using the extracted current identification value;

(h) extracting a first video data information from a first video data information segment received following the first current data information segment using the extracted current second value;

(i) storing the extracted first video data information using the activated first queue buffer; and (j) repeating the steps of (h) through (i) based on the extracted current second value.

19. The method of claim 18, further comprising:

(k) monitoring the sequentially received data information segments;

(l) determining a second current data information segment, within the sequentially received data information segments, and processing the second current data information segment to extract a next identification value, a next first value, and a next second value;

(m) comparing the next identification value with the current identification value,
if the comparison indicates the next identification value is identical to the current identification value, activating the first queue buffer using the current identification value, and
if the comparison indicates the next identification value is different than the current identification value, activating a second queue buffer using the next identification value;
(n) extracting a second video data information using a first video data information segment received following the second current data information segment;
(o) storing the extracted second video data information using one of the first and second queue buffers in accordance with the comparison result of step (m); and
(p) repeating the steps of (n) through (o) based on the extracted next second value.

20. The method of claim 19, wherein whenever one of the first and second queue buffers is activated, the other queue buffer is deactivated.

21. The method of claim 20, wherein a first error data information segment is generated and transmitted using the bandwidth limited transmission link whenever any one of the steps (j) and (p) completes with errors.

22. The method of claim 19, wherein any one of the current first value and the next first value is used to program the buffer size of any one of the first and second queue buffer.

23. The method of claim 22, further comprising:
(q) transferring the stored video data information out of any one of the first and second queue buffers in accordance with the generated video data information transfer request;
(r) receiving the transferred video data information; and
(s) storing the transferred video data information using a memory device, wherein the memory device comprises video data information for at least one image.

24. The method of claim 23, further comprising:
(t) processing the video data information stored in the memory device to produce one output image; and
(u) displaying the processed video data information using an electronic display.

25. The method of claim 24, wherein processing the video data information stored in the memory device comprises the processing of video data information of at least two images to produce video data information for a first output image.

26. The method of claim 25, wherein the first output image having a second resolution value that is greater than the first resolution value.

27. The method of claim 25, wherein processing the video data information stored in the memory device comprises the processing of video data information of multiple images to produce video data information for a second output image using a predefined region, within the second output image, for each one of the multiple images.

28. The method of claim 25, wherein processing the video data information stored in the memory device comprises blending of video data information of multiple images to produce video data information for a third output image in accordance with predefined programmable preferences.

29. The method of claim 19, wherein a video data information transfer request is generated whenever any one of the steps (j) and (p) completes successfully.

30. The method of claim 19, wherein one of the first and second queue buffers is used to store video data information corresponding to a live video data information source, and the other queue buffer is used to store video data information corresponding to at least one of graphics, text, and static video data information sources.

31. The method of claim 19, wherein one of the first and second queue buffers is used to store video data information corresponding to a right channel video source of a 3D image, and the other queue buffer is used to store video data information corresponding to a left channel video source of the 3D image.

32. A method of receiving multiple video images over a bandwidth limited transmission link, the method comprising the steps of:
(a) sequentially receiving data information segments using the bandwidth limited transmission link;
(b) determining a current data information segment, within the sequentially received data information segments, and processing the current data information segment to extract a current identification value, a current first value, and a current second value, wherein (i) the current second value corresponds to a number of video data information segments to be received immediately after the current data information segment, (ii) the current first value corresponds to total number of parts that a current image is partitioned into, and (iii) the current identification value associates the video data information segments to be received immediately after the current data information segment with the current image;
(c) comparing the current identification value with a previous identification value extracted from a preceding data information segment,
if the comparison indicates the current identification value is identical to the previous identification value, activating a first queue buffer using the previous identification value, and
if the comparison indicates the current identification value is different than the previous identification value, activating a second queue buffer using the current identification value;
(d) extracting video data information using a video data information segment received following the current data information segment;
(e) storing the extracted video data information using one of the first and second queue buffers that is activated in accordance with the comparison result of step (c);
(f) repeating the steps of (d) through (e) based at least on the current second value; and receiving a next data information segment, wherein (i) an error flag is asserted if a total number of video data information segments, received between the current data information segment and the next data information segment, is different than the current second value, and (ii) a frame flag is asserted upon storing entire video data information corresponding to the current image.

33. The method of claim 32, further comprising:
(g) generating a first error data information segment based on the asserted error flag; and
(h) transmitting the first error data information segment using the bandwidth limited transmission link.

34. The method of claim 32, further comprising:
(i) generating a current image video data information transfer request based on the asserted frame flag; and
(j) transferring and storing the video data information of the current image to a memory device, wherein the memory device has a storage capacity that is at least four times the capacity needed to store the video data information of the current image.

35. The method of claim 34, further comprising:
(k) processing video data information stored in the memory device to produce video data information of a first output image; and
(l) displaying the processed video data information of the first output image using an electronic display.

36. The method of claim 35, wherein processing video data information stored in the memory device comprises the processing of video data information of the current image and video data information of at least one additional image.

* * * * *